United States Patent [19]
DiLernia

[11] Patent Number: 5,867,938
[45] Date of Patent: Feb. 9, 1999

[54] NATURAL APPEARING PLANTER

[76] Inventor: Joseph DiLernia, 6 North Ct., Mt. Sinai, N.Y. 11766

[21] Appl. No.: 820,494

[22] Filed: Mar. 19, 1997

[51] Int. Cl.⁶ .................................................. A01G 31/02
[52] U.S. Cl. ........................................... 47/65.5; D11/149
[58] Field of Search ................................... D11/149, 151; 47/65.5, 66.6

[56] References Cited

U.S. PATENT DOCUMENTS

| | | | |
|---|---|---|---|
| D. 4,273 | 8/1870 | Leak et al. .............................. | D11/151 |
| D. 7,507 | 6/1874 | Hews ..................................... | D11/151 |
| D. 362,405 | 9/1995 | Dallimore .............................. | D11/143 |
| 397,732 | 2/1889 | Landis . | |
| 657,050 | 8/1900 | Bick et al. . | |
| 767,175 | 8/1904 | Sibole .................................... | D11/149 |
| 1,486,705 | 3/1924 | Walker . | |
| 1,993,631 | 3/1935 | Smith . | |
| 2,069,580 | 2/1937 | Gaskins, Jr. . | |
| 2,859,558 | 11/1958 | Hallum . | |
| 3,142,935 | 8/1964 | Campos ..................................... | 47/47 |
| 3,354,580 | 11/1967 | Amortegul .................................. | 47/47 |
| 3,951,294 | 4/1976 | Wilson ........................................ | 220/5 |
| 4,022,436 | 5/1977 | Thomas ..................................... | 256/24 |
| 4,076,490 | 2/1978 | Hilker ..................................... | D11/151 |
| 4,106,233 | 8/1978 | Horowitz ..................................... | 47/44 |

FOREIGN PATENT DOCUMENTS

| | | | |
|---|---|---|---|
| 3402616 | 8/1985 | Germany ............................... | 47/65.5 |
| 446015 | 4/1936 | United Kingdom .................. | D11/151 |

OTHER PUBLICATIONS

"Gifts and Decorative Accessories" Feb. 1976, p. 98.
"Henri Studios" non–patent prior art, which are photographs dated May 1996.

Primary Examiner—Michael J. Carone
Assistant Examiner—Joanne C. Downs
Attorney, Agent, or Firm—Alfred M. Walker

[57] ABSTRACT

An elongated cylinder-like shaped ornamental planter simulated a portion of a tree, naturally formed and found in nature. Extending from the main body of about eighteen inches is a protrusion forming a V-shaped balancing arm simulating a limb smaller in size from the main body. A hollowed body chamber cavity extends the whole length to contain earth and flora. Irregular shaped oval openings are situated along the top of the main body to simulate knot holes. The bottom surface of the main body is smooth and flat containing drain holes for water. The outer surface of the main body includes many irregularly shaped and positioned placed simulated tree-like characteristics. Irregular bark texture covers or surrounds the outer surface and tree-like characteristics. Varied applications of colors give each simulated log or portion of a tree, their own distinctive look.

6 Claims, 7 Drawing Sheets

NATURAL APPEARING PLANTER

FIELD OF THE INVENTION

This invention relates to flora planters, specifically to expand their versatility in appearance and function. The indoor-outdoor planters, specifically are designed to simulate a portion of a tree naturally formed and found in nature, and to expand the range of a planter to also function as an ornament.

BACKGROUND OF THE INVENTION

There are many types of planters available. Most common are square, rectangular or cylindrical shaped containers of varying size. Some have either a plain smooth outer surface texture or a rough raised surface texture. Some may be plain in color or have designs applied to their surface. However, they do not totally simulate a portion of a tree naturally formed and found in nature, in appearance and function.

Inventors have created products in the garden world that have a simulated bark or tree characteristics applied to their surface.

U.S. Pat. No. 657,050 of Bick, et al. discloses the object of their invention, which is to ornament objects of any description in imitation of tree bark with knobs projecting from its surface. The Bick '050 process is to apply a paper-mache substance while in a smooth soft state to the surface of objects, such as bottles, glass, metal goods, picture frames, earthenware, etc. Wooden plugs would have to be added to simulate knots and scores would have to be applied to the paper-mache surface to simulate bark texture. Although a partial realism of simulated bark texture to the outer surface of an object could be obtained, it would be after much work of scoring the surface and may not simulate a more detailed bark texture with additional characteristics as found in nature. It is further unlikely that one would find any objects decorated with this process existing out in the landscape of nature.

While the Bick '050 object is to apply a process to objects not found in nature to simulate a bark-like appearance to their outer surface, in contrast, in the present invention, the objective is to fully simulate the look and function of an object that would be found and formed naturally in nature.

U.S. Pat. No. 4,106,233 of Horowitz discloses the invention of an elongated plant holding trellis with integrally-formed members simulating natural wood bark along one surface. The members snap together to interlock horizontally and/or vertically in the support of a vine-like plant. Although not stated, however detailed are the trellis supports with simulated bark board, their objective is to support flora in a climbing relationship, not to contain flora as in the present invention.

U.S. Pat. No. 2,069,580 of Gaskins relates to an article of manufacture made from a conical shaped cypress tree knee. One object of Gaskins '580 is the production of a vase or pot for growing flowers, particularly designed for tropical or moisture-loving plants. The vase or flower pot is realized after the knee is removed from the root of the tree. A bottom is then fastened on and holes are bored in. Because its construction maintains a humid atmosphere, the planter of Gaskins '580 may not be suitable for plants requiring much less amount of moisture in their growing process. The difficulty in growing plants needing much less moisture than tropical or exotic plants is realized due to the hollowed out conical shaped chamber of the cypress knee, which is capable of holding a large quantity of moisture within for long periods of time. In comparison, an opened-aired planter such as the present invention allows moisture to leave more readily, allowing more control of a water schedule. An enhanced danger exists for plants other than tropical or exotic when conditions for extended periods of rain and dampness exist with the upright, conical planter of Gaskins '580.

Due to its conical shape, moisture would gather on the knee of Gaskins '580 and advance downward, seeping into the bored out holes and into the inner chamber containing the plants and root system. If there was short periods of dryness between rainy or damp periods, it would only allow little moisture to evaporate or escape this humidified atmosphere, leaving plant and roots in an almost constant wet state. This may harm or kill plants where this constant wet state is not conducive to their survival.

Gaskins '580 also states that the level of earth is preferably made close to the level of the openings so that the plant does not suffer from dearth of sunlight during the brief time required for it to develop large enough to grow out of the openings. Time required to develop a large enough plant indicates a plant in an immature state which could greatly increase the risk of dying due to overwatering.

Though it may be an acceptable planter for tropical or exotic plants where living in a constant wet state for extended periods of time may not harm them, the planter of Gaskins '580 may not be a suitable environment for most other plants.

Another prior art planter is that of Henri Studios, which include cylindrical wood-like hollow planters completely open at a top edge, wherein the planters are decorated with auxiliary cartoon-like statues of animals, which detract from the overall natural look of the planter. Furthermore, the planters of Henri Studios are devoid of auxiliary limbs extending obliquely from axis of the cylindrical wood bodies. The one version which has an auxiliary portion includes a limb member extending generally parallel to an axis of an open upwardly extending cylinder.

OBJECTS OF THE INVENTION

Accordingly, several objects and advantages of the present invention are to provide a planter that has additional characteristics and qualities of a common smooth or rough surfaced planter, whether square, rectangular or cylindrical shaped.

Another object of the present invention is to provide a planter that may be used solely as an outdoor ornament without incorporating any flora.

Another object of the present invention is to provide a planter that simulates a portion of a tree comprising of more than one compartment for planting flora.

A further object of the present invention is to provide a planter that simulates a portion of a tree comprising of many tree-like characteristics and colors.

Another object of the present invention is to provide a planter that does not limit the planting of flora to within, but also allows planting on the outside or around planter to also achieve a natural setting as found in nature.

It is another object of the present invention to provide a planter that can be used indoors or outdoors.

A still further object of the present invention is provide a planter that simulates a look of a portion of a tree formed and found in nature.

It is a further object of the present invention to provide a planter that simulates a function of a portion of a tree formed and found in nature.

These and other objects and advantageous of the present invention will become apparent to those skilled in the art from the following description of preferred embodiments, claim and appended drawings.

SUMMARY OF THE INVENTION

In keeping with these objects and others which may become apparent, the present invention is an elongated cylinder-like shaped ornamental planter simulating a portion of a tree naturally formed and found in nature. Extending from the main body of about twenty seven inches is a protrusion forming a V-shaped balancing arm simulating a limb smaller in size from the main body. A hollowed body cavity chamber extends the whole length therein to contain earth and flora. Irregular shaped oval openings are situated along the top of the main body to simulate knot holes. The bottom surface of the main body is smooth and flat containing drain holes for water. The outer surface of the main body is comprised of many irregularly shaped and positioned simulated tree-like characteristics. Irregular bark texture covers or surrounds the outer surface and tree-like characteristics. Varied applications of colors give each simulated log, or portion of a tree, their own distinctive look and appearance.

There is an important distinction separating the planter of the present invention from others. Other prior art planters incorporate the use of simulated wood characteristics by some of the following examples:

The simulated wood characteristics are at times made to enhance the outer portions of any shaped conventional planter, such as a flower pot or container, a garden trellis, a bird bath, or vertical plant supports placed in flower pots or containers. The objective of all of these planters is that they use the simulated wood characteristics only in the aesthetics of their conventional shape and not in the function of the planter.

A particular distinction that makes the present invention different is that it not only simulates natural tree characteristics but goes beyond aesthetics and is equally essential in and part of the function of the invention. The present invention is the total simulation of both look and function of a portion of a tree found in the true spirit of nature. Its function is to actually be a portion of a tree, to be placed indoors or outdoors so as to simulate a unique, pleasing beautiful look and appearance, found in nature when a plant or flower grows naturally in, around, or through a portion of a live or dead tree.

The planter of the present invention enables users to place it indoors or outdoors to create their own unique setting by planting flowers or plants in, around, or through the planter of the present invention. The planter of the present invention may also be used when placed indoors or outdoors by itself, without the use of plants or flowers in, around or through it, to be solely enjoyed for its realistic simulation of a unique article of nature.

DESCRIPTION OF THE DRAWINGS

The present invention can best be understood in conjunction with the accompanying drawings, in which.

DETAILED DESCRIPTION OF THE DRAWINGS

As shown in FIGS. 1–7, planting container 1 is hollow, with the look of a natural hollowed-out tree limb. Planting container 1 includes a body member 2 having at least one cavity 3 for receiving potting soil for growing decorative plants therein.

Figure 6:
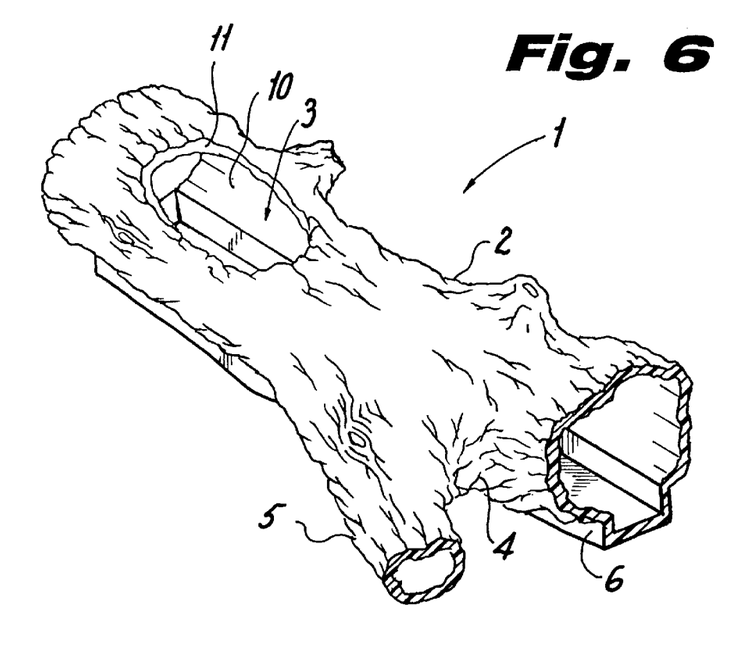
FIG. 6 is a perspective view thereof in partial section.
Figure 7:
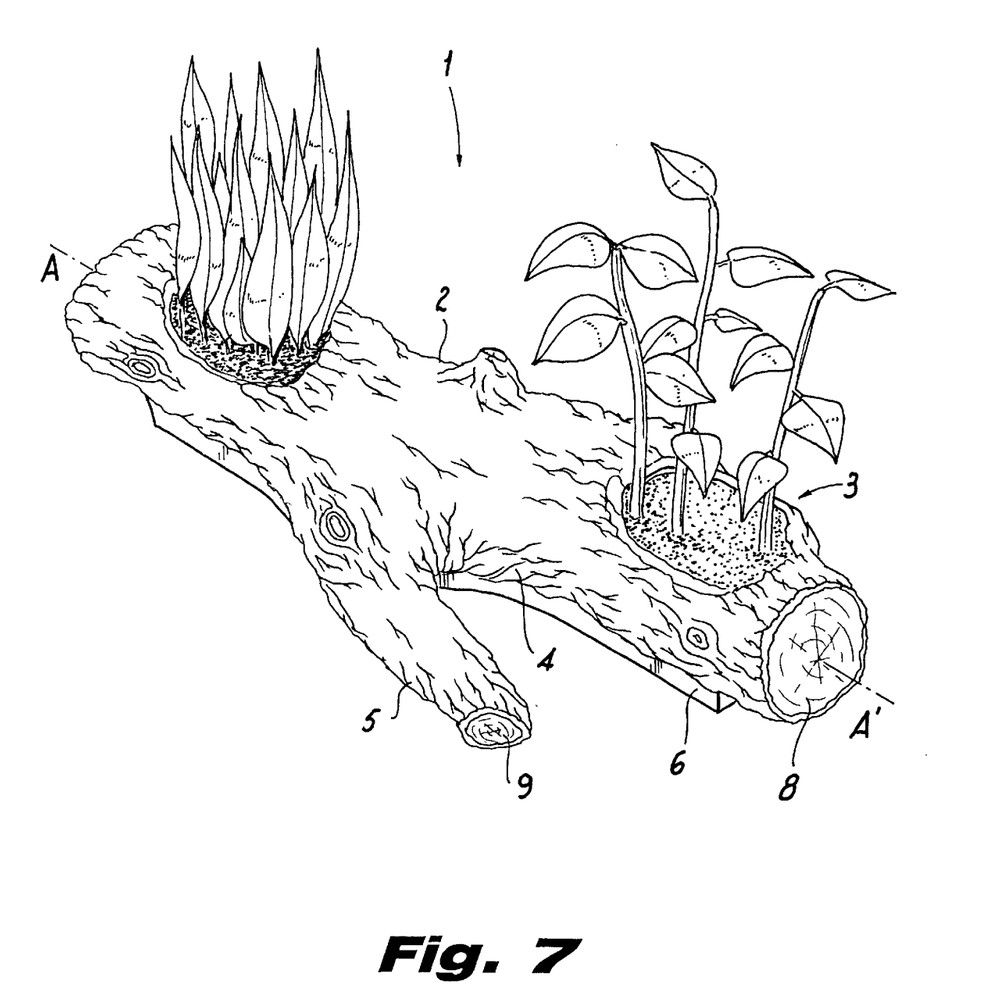
FIG. 7 is a perspective view thereof, shown with plants therein.

As shown in FIG. 6, body member 2 is preferably molded plastic, since, as shown in FIG. 6 in partial cross section, the cross sectional hatch marks include alternating thick and thin angled lines extending at an angle, depicting a plastic material.

Optionally, body member 2 has an appearance of a natural tree limb with a generally cylindrical shape.

Figure 1:
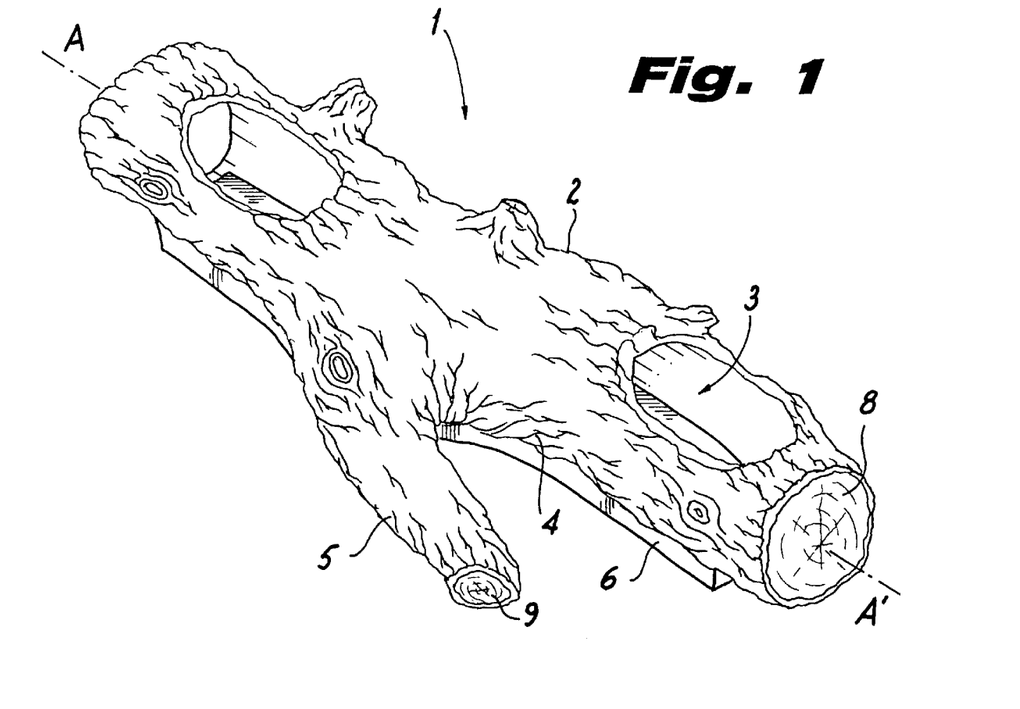
FIG. 1 is a perspective view of the planter as in the present invention.

Planting container 1 and body member 2 further include an irregular exterior surface 4 having the look and feel of a simulated tree bark. Optionally, because cylindrically shaped body member 2 tends to roll about its longitudinal axis A-A', planting container 1 includes a stabilizing means, such as an auxiliary limb stump, for secure positioning of planting container 1 in a desired decorative location upon the ground. Another optical stability means includes flat base 6. However, even with base 6, planting container 1 is more stable wherein the body member 2 has at least one branching member, such as stabilizing means 5, extending obliquely from a longitudinal axis of body member 2.

In a further embodiment, the planting container has at least one additional planting cavity (not shown) in stabilizing means 5. Although planting container 1 is shown in a horizontal orientation, other orientations are possible, such as an upright cylindrical tree stump.

Figure 2:
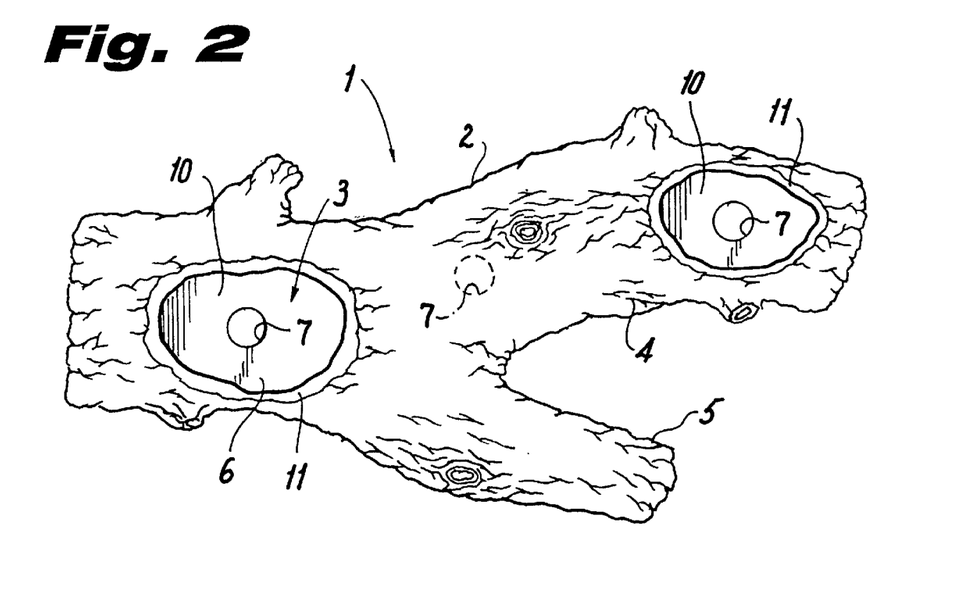
FIG. 2 is a top plan view of the planter as in FIG. 1.
Figure 3:
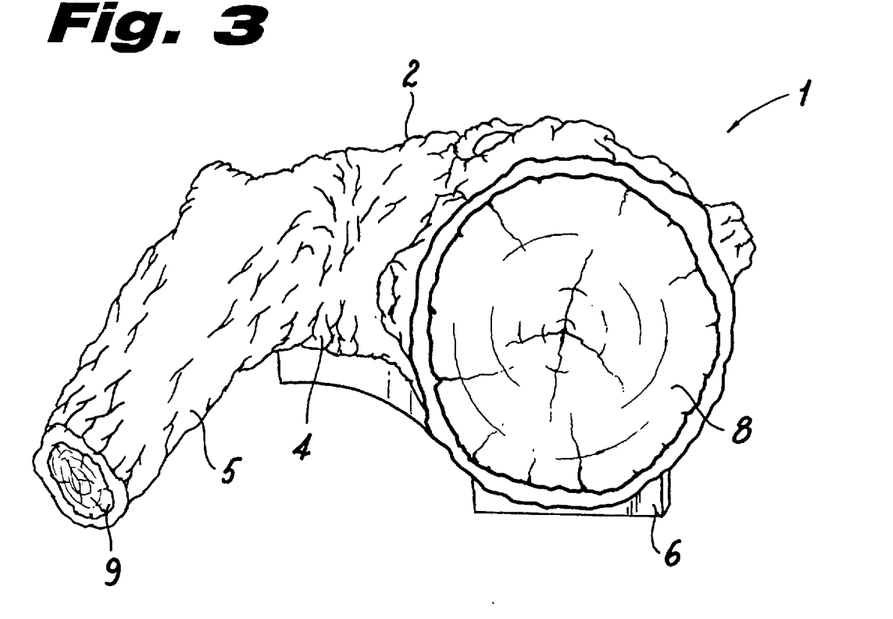
FIG. 3 is a front elevational view thereof.
Figure 4:
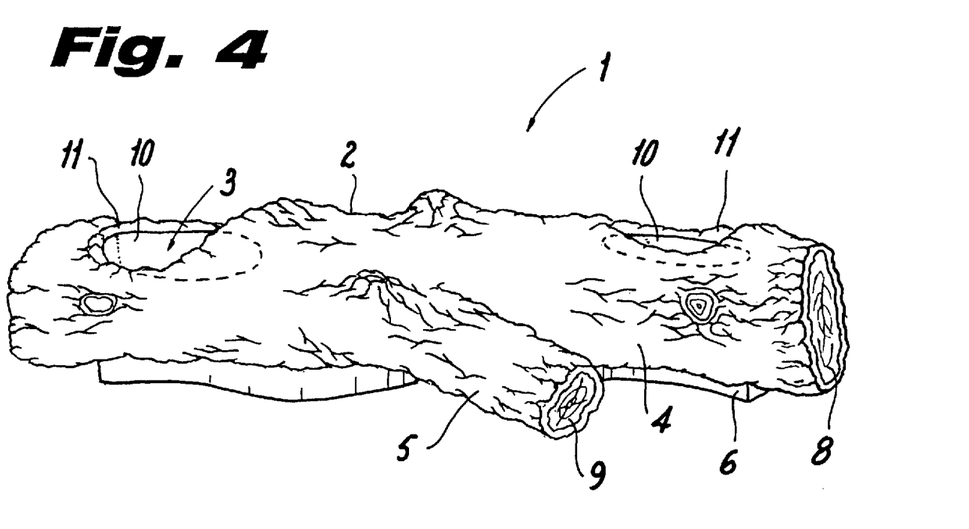
FIG. 4 is a left side elevational view thereof.
Figure 5:
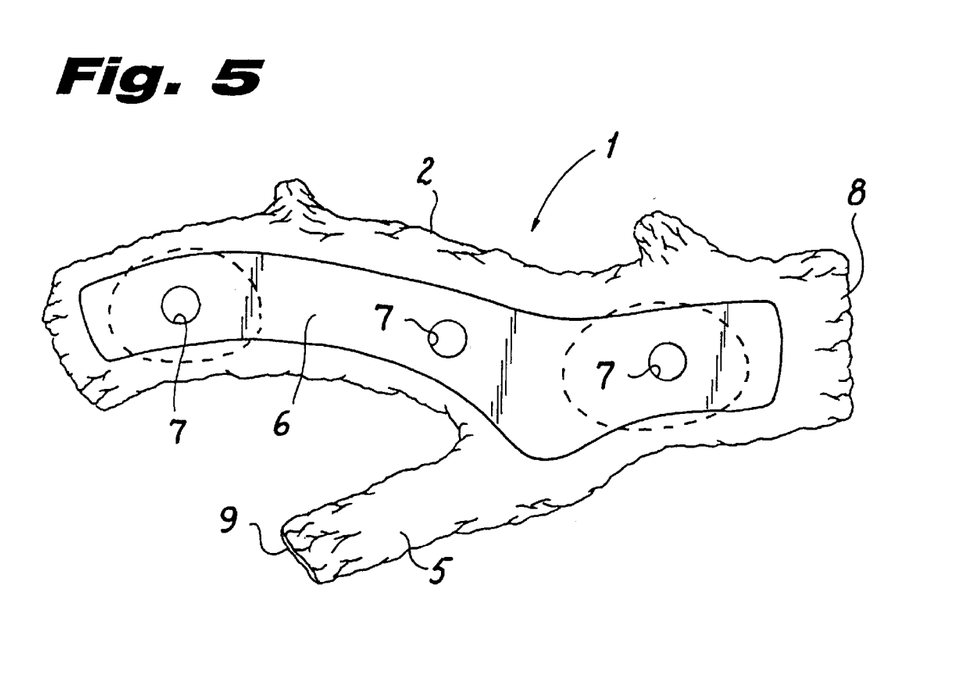
FIG. 5 is a bottom view thereof.

As shown in FIG. 2, to effect proper drainage, base 6 may include drainage holes 7 for transfer of water therethrough.

A further feature includes one or more generally flat faces 8, to simulate a sawed-off wood face, or rough face 9, to simulate a fractured off-wood face.

To hold plants therein, one or more plants and potting soil is inserted through apertures 10 simulating knot holes having lip edges 11 into cavity 3.

Figure 8A:
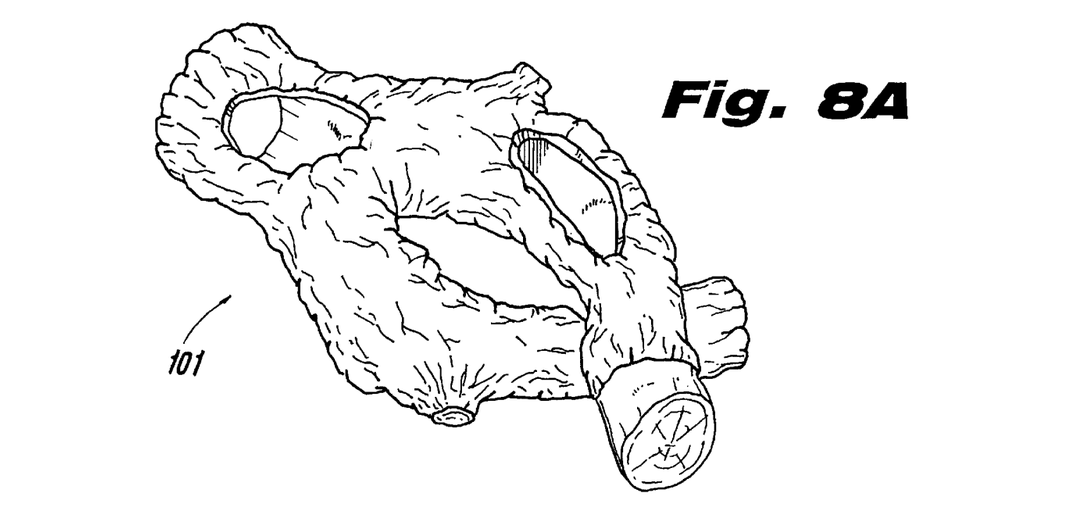
FIGS. 8A, 8B and 8C are perspective views of alternate embodiments for a planter in accordance with the present invention.
Figure 8B:
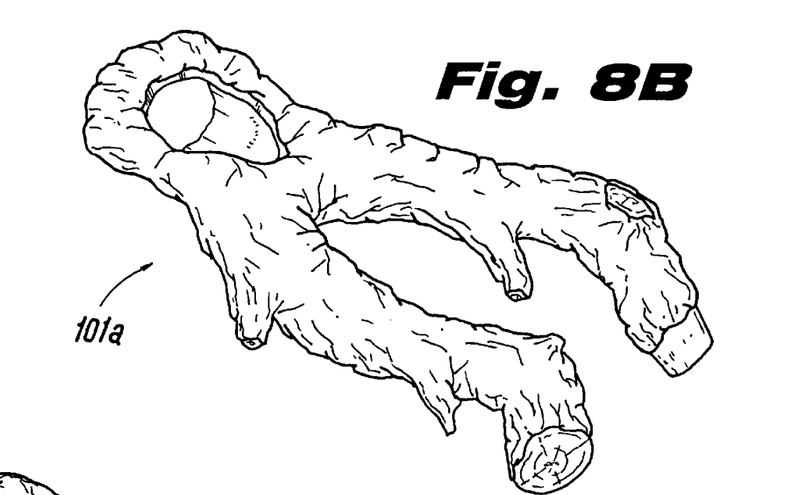
Figure 8C:
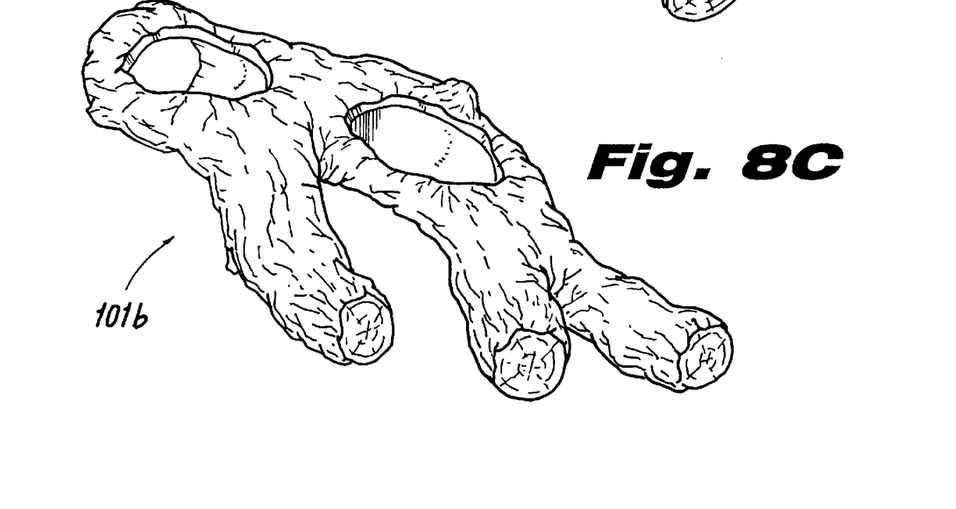
Figures 9A, 9B, 9C:
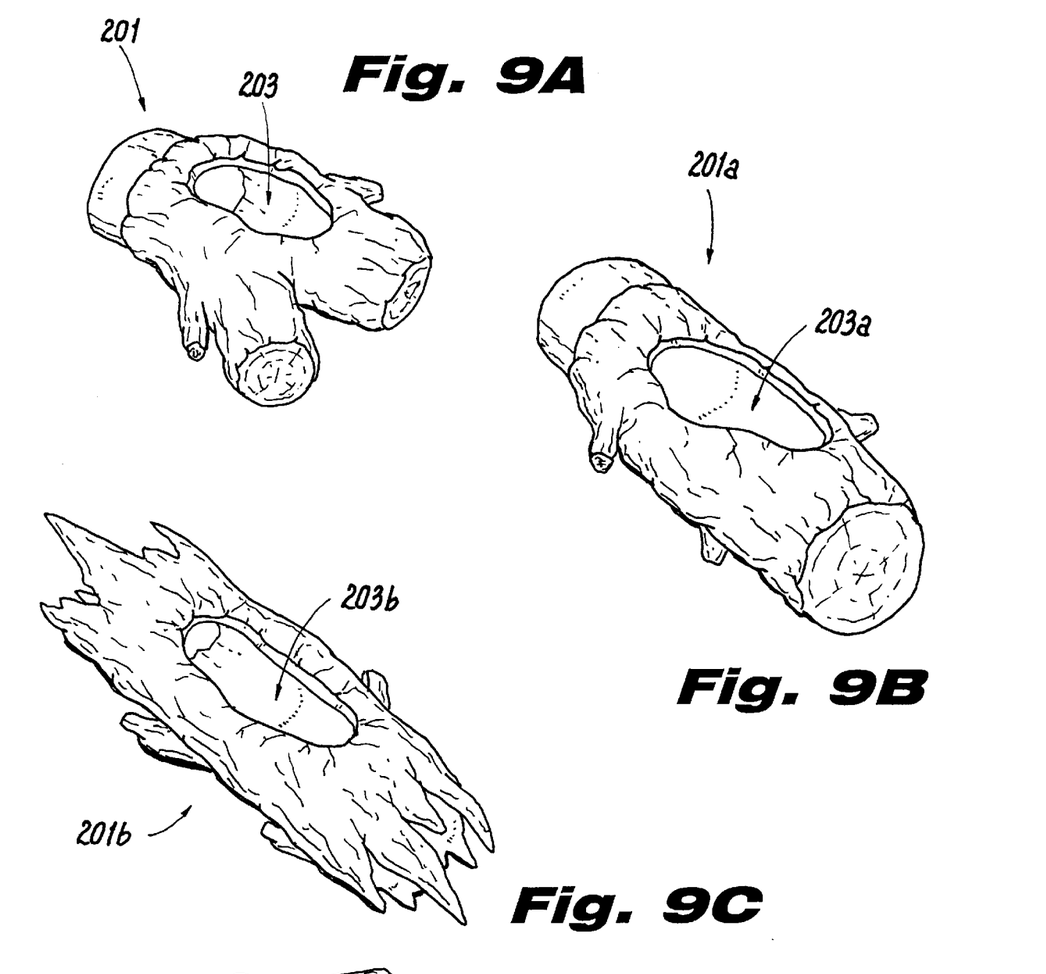
FIGS. 9A, 9B, 9C and 9D are perspective views of further alternate embodiments for a planter in accordance with the present invention.
Figure 9D:
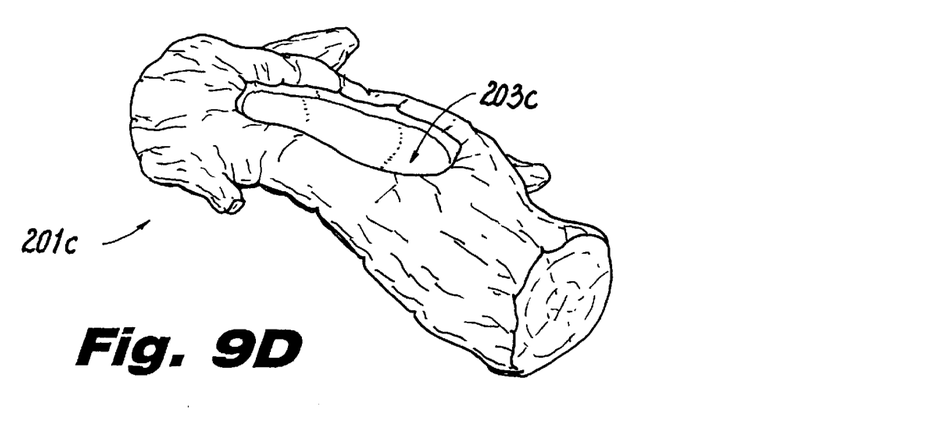
Figure 10A:
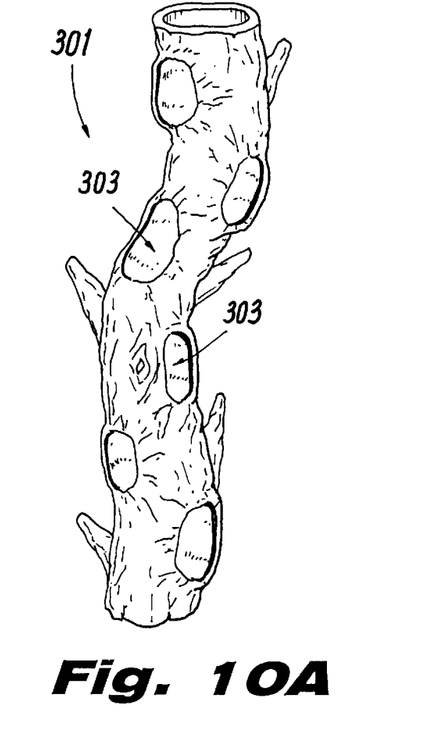
FIGS. 10A, 10B, 10C and 10D are perspective views of bird feeder alternate embodiments of the present invention.
Figure 10B:
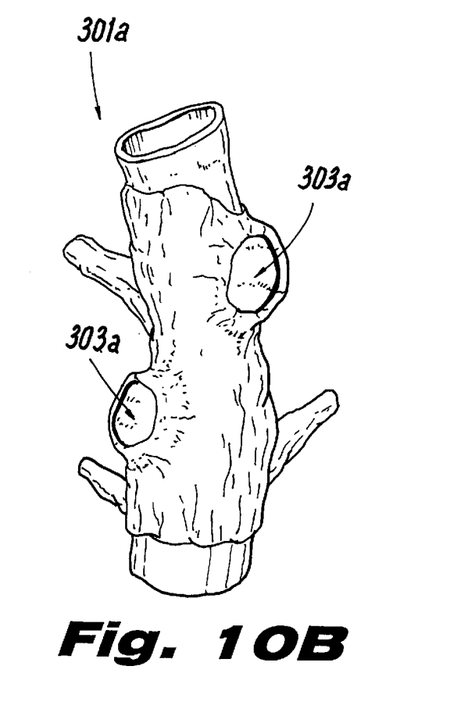
Figure 10C:
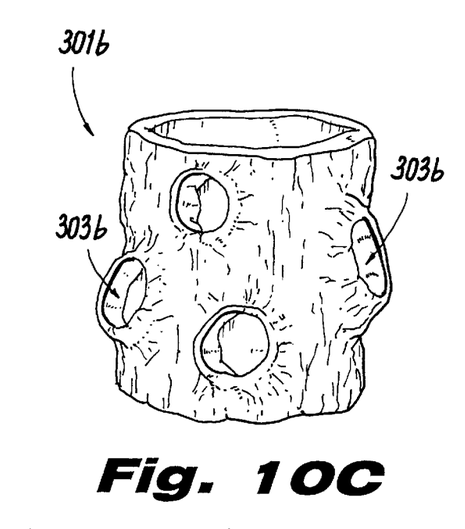
Figure 10D:
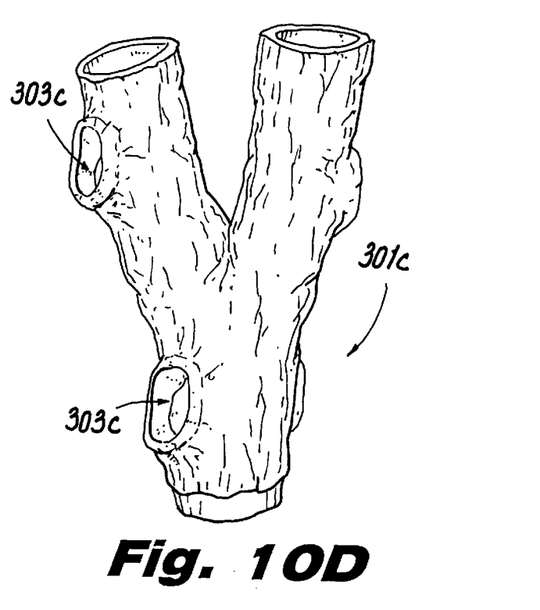

FIGS. 8A, 8B, and 8C respectively show alternate embodiments 101, 101a, and 101b for planters in accordance with present invention.

FIGS. 9A, 9B, 9C, and 9D respectively show further alternate embodiments 201, 201a, 201b, and 201c for planters having single cavities 203, 302a, 203b, and 302d to accommodate plants therein.

FIGS. 10A, 10B, 10C, and 10D respectively show further embodiments for bird feeders 301, 301a, 301b, and 301c having cavities 303, 303a, 303b, and 303c to accommodate birds therein.

It is further noted that other modifications may be made to the present invention, without departing from the scope of the invention, as noted in the appended claims.

I claim:

1. A planting container with the look of a natural hollowed-out tree limb, comprising:

a generally cylindrical body member having at least one cavity for receiving potting soil for growing decorative plants;

said body member having an appearance of a natural tree limb, and at least one simulated partial branch limb member extending obliquely to a longitudinal axis of said body member;

said body member further having an irregular exterior surface having the look and feel of a simulated tree bark, said planting container having a stabilizing means for secure positioning of said planting container in a desired decorative location, said stabilizing means comprising said at least one obliquely extending simulated partial branch limb member; and said at least one branching member having at least one planting cavity therein.

2. The planting container as in claim 1 wherein said generally cylindrical body member comprises plastic.

3. A planting container with the look of a natural hollowed-out tree limb, comprising:

a generally cylindrical body member having at least one cavity for receiving potting soil for growing decorative plants;

said body member having an appearance of a natural tree limb, and at least one simulated partial branch limb member extending obliquely to a longitudinal axis of said body member and having at least one planting cavity therein;

said body member further having an irregular exterior surface having the look and feel of a simulated tree bark, said planting container having a stabilizing means for secure positioning of said planting container in a desired decorative location and said planting container further having a flat base.

4. The planting container as in claim 3 wherein said generally cylindrical body member comprises plastic.

5. A planter container comprising an elongated cylinder-like shaped body member simulating a portion of a tree naturally formed and found in nature, said body member having extending from said body member an oblique protruding branch, said body member and said branch forming a V-shaped balancing arm, said branch simulating a tree limb smaller in size than a size of said body member, said body member having a hollowed body cavity chamber extending in a longitudinal length therein to contain earth and flora, said body member having at least one irregular shaped oval opening situated along a top of said body member to simulate knot holes, said body member having a bottom surface base, said base being flat and containing drain holes for water drainage of water therethrough, said body member having an outer surface including a simulated irregular bark texture covering the outer surface thereof.

6. The planting container as in claim 5 wherein said cylinder-like shaped body member comprises plastic.

* * * * *